United States Patent
Gunda et al.

(10) Patent No.: US 7,676,687 B2
(45) Date of Patent: Mar. 9, 2010

(54) METHOD, COMPUTER PROGRAM PRODUCT, AND SYSTEM FOR LIMITING ACCESS BY A FAILED NODE

(75) Inventors: Kalyan C. Gunda, Wappingers Falls, NY (US); Gautam Shah, Shrewsbury, MA (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 11/536,008

(22) Filed: Sep. 28, 2006

(65) Prior Publication Data
US 2008/0155315 A1 Jun. 26, 2008

(51) Int. Cl.
G06F 11/07 (2006.01)

(52) U.S. Cl. .......................................................... 714/4

(58) Field of Classification Search ...................... 714/7, 714/8, 4; 709/239; 710/200
See application file for complete search history.

(56) References Cited

U.S. PATENT DOCUMENTS

| | | | |
|---|---|---|---|
| 5,394,554 A | 2/1995 | Elko et al. | |
| 5,416,921 A | 5/1995 | Frey et al. | |
| 6,032,216 A | 2/2000 | Schmuck et al. | |
| 6,212,595 B1 * | 4/2001 | Mendel | 711/1 |
| 6,708,175 B2 | 3/2004 | Curran et al. | |
| 6,915,391 B2 | 7/2005 | Wang-Knop et al. | |
| 7,590,737 B1 * | 9/2009 | Chen et al. | 709/226 |
| 2002/0188590 A1 * | 12/2002 | Curran et al. | 707/1 |
| 2004/0123053 A1 * | 6/2004 | Karr et al. | 711/152 |
| 2005/0268154 A1 * | 12/2005 | Wipfel et al. | 714/4 |
| 2007/0022138 A1 * | 1/2007 | Erasani et al. | 707/104.1 |

* cited by examiner

*Primary Examiner*—Scott T Baderman
*Assistant Examiner*—Chae Ko
(74) *Attorney, Agent, or Firm*—Cantor Colburn LLP; Steven Chiu

(57) ABSTRACT

In a multi-node computer system, file access by a failed node is limited. Upon receipt on an indication of a node failure, a fencing command is sent to disks in a disk subsystem to which the failed node has access. If the fencing command sent to a disk fails, the fencing command is sent to a server having access to at least one disk in a disk subsystem to which the failed node has access to limit access by the failed node to the disk in the disk subsystem. If the fencing command sent to the server does not result in limiting access by the failed node to all the disks in the disk subsystem, sending the command to another server having access to at least one disk in the disk subsystem to limit access by the failed node to the disks in the disk subsystem. The fencing command may be sent to various servers until access by the failed node to all the disks in the disk subsystem is limited or until the fencing command has been sent to all the servers. The fencing command may be sent one at a time to servers having access to the disks in the disk subsystem, may be sent concurrently to all the servers having access to the disks in the disk subsystem, or may be forwarded from one server to another.

20 Claims, 2 Drawing Sheets

METHOD, COMPUTER PROGRAM PRODUCT, AND SYSTEM FOR LIMITING ACCESS BY A FAILED NODE

BACKGROUND

The present disclosure relates generally to controlling access to files in a disk subsystem and, in particular, to limiting access to files.

A file system is a computer program that allows other application programs to store and retrieve data on media, such as disk drives. A file structure is the organization of data on the disk drives. A shared disk file system is one in which a file structure residing on one or more disks is accessible by multiple file systems running on shared computers or nodes which may include one or more data processing units. A multi-node file system is one that allows shared access to files that span multiple disk drives on multiple nodes or clusters of nodes.

In a multi-node file system, such as IBM's General Parallel File System (GPFS), one node in a cluster of nodes is designated as the manager of a file system. This node controls functions for that file system and is commonly referred to as the file system manager (fsmgr).

Occasionally, a node that is using the file system may fail. This may occur, for example, if a lease for network connection is not renewed for a node. When a node that is using the file system crashes or is declared dead due to loss of network connection, the fsmgr has to perform recovery actions to handle the failure of the node. This includes ensuring that the failed node will not perform any I/O operations after the rest of the nodes in the cluster recognize that it has failed. Ensuring the failed node cannot perform any I/O operations is achieved by "fencing" the failed node off.

Traditionally, the fsmgr handles fencing of the failed node by issuing fencing calls to the logical subsystem or disk drives to "fence off" the failed node from accessing the disks in the disk subsystem. This process of fencing is based on an inherent assumption that the logical disks or partitions in a disk subsystem are available/reachable/accessible by the file system manager. However, in some cases, the file system manager may not have access to all the disks in the subsystem, e.g., in the event of a path failure. In this case, the fencing command may not reach all the disks. This results in a fencing failure which, in turn, may result in corrupted data on the disk subsystem. This, in turn, may result in application failure and loss of availability of the data in the disk subsystem. To prevent this, the filesystem is unmounted on all nodes in the cluster. The issue becomes more of a problem in heterogeneous environments (e.g., mixed aix/linx/x86/ppc64 clusters), where the fsmgr may not have access to a disk or may lose access to disks. In such cases, where the fsmgr cannot directly issue fencing calls, there needs to be a way to handle fencing of a failed node.

There is thus a need for fencing a failed node to limit access by the failed node even in those cases in which the file system manager is unable to directly issue fencing calls to the disk subsystem.

SUMMARY

According to exemplary embodiments, a method, computer program product, and system are provided for limiting file access by a failed node in a multi-node computer system. Upon receipt of an indication of a node failure, the filesystem manager tries to fence all the disks from the failed node. If the fencing command sent to the disk fails, due, e.g., to the filesystem manager not having access to the disks or due to path failure, etc., then the fencing command is sent to a server having access to at least one disk in a disk subsystem to which the failed node has access to limit access by the failed node to the disk in the disk subsystem. If the fencing command sent to the server does not result in limiting access by the failed node to all the disks in the disk subsystem, the fencing command is sent to another server having access to at least one disk in the disk subsystem to limit access by the failed node to the disks in the disk subsystem. The fencing command may be sent to various servers until access by the failed node to all the disks in the disk subsystem is limited or until the fencing command has been sent to all the servers. The fencing command may be sent one at a time to servers having access to the disks in the disk subsystem, may be sent concurrently to all the servers having access to the disks in the disk subsystem, or may be forwarded from one server to another.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
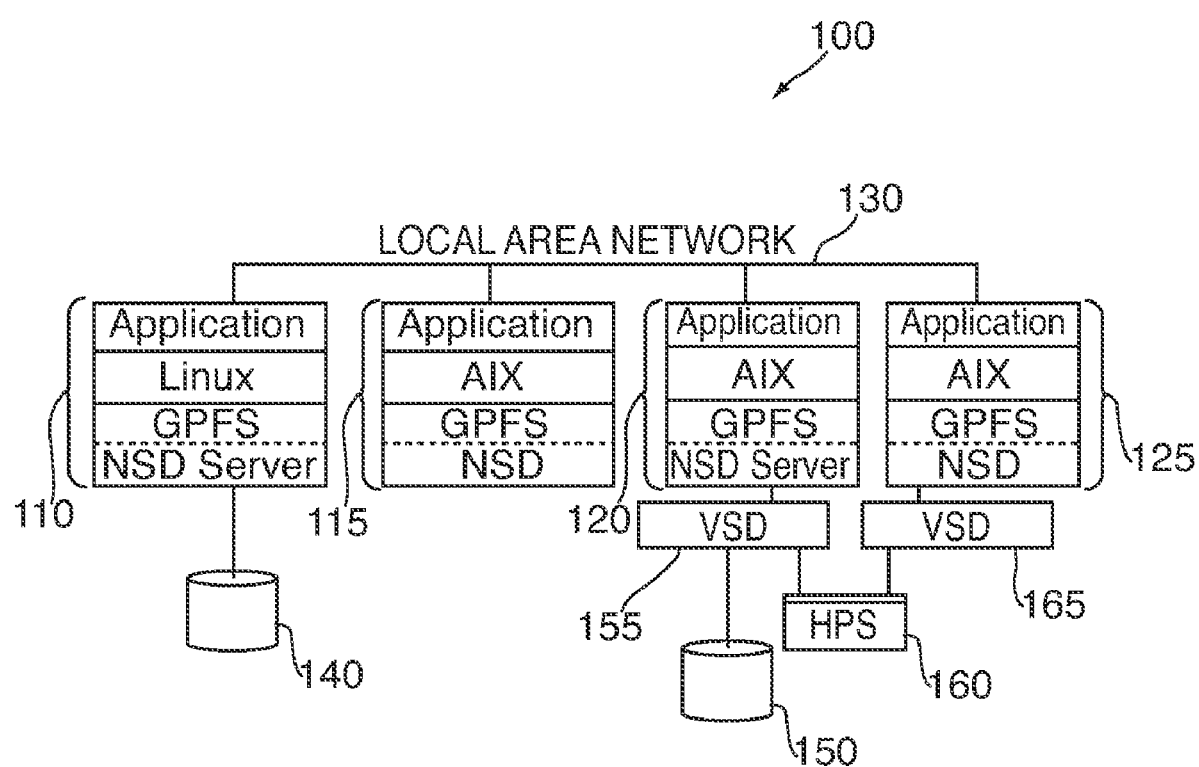
FIG. 1 illustrates an exemplary multi-node computer system in which fencing may be implemented according to an exemplary embodiment.

The detailed description explains exemplary embodiments, together with advantages and features, by way of example with reference to the drawings.

DETAILED DESCRIPTION

GPFS is a multi-node file system based on a shared disk model. In this type of system, a disk subsystem may be accessed from every node locally without requiring direct access. In an AIX environment, this capacity is provided by a virtual shard disk (VSD) component via a High Performance Switch (HPS). In a Linux environment or AIX environments using other interconnect infrastructures, this capacity is provided using a Network Shared Disk (NSD). GPFS uses NSD (and VSD if a HPS is present) to provide high-speed access to data for application running on computer nodes.

NSD nodes can be created on different kinds of logical disks. During the creation of NSDs, one or more NSD nodes having direct access to a disk subsystem may be specified as a server(s) so that nodes that don't have a path to the disk subsystem can reach the disk subsystem via that node which has a path to the disk subsystem.

Each GPFS file system has a file system manager that performs file management functions and coordinates access to file system metadata, recovery, etc. When a node "fails" (i.e., the node dies or communication is lost to the node due to network failure), then that node is declared dead, and the file system manager performs recovery for the dead node. It should be noted that those skilled in the art will appreciate how node failure is detected. Details regarding detection of node failure are explained, for example, in U.S. Pat. No. 6,708,175, herein incorporated by reference. Before recovery can be initiated, the file system manager needs to ensure that any I/O traffic issued from the failed node will not reach a disk. According to an exemplary embodiment, the file manager does this by issuing an appropriate fence command, that is, one that is supported by the disk subsystem used to create the NSD. Of course, if the file system manager fails, this function may be taken over by another node, and the fencing command can then be issued by that node.

According to an exemplary embodiment, during failure processing of a node by a file system manager, the file system manager will try to issue a "fence" to the disk subsystem. If the fence fails, e.g., due to disk failure or path failure, the fencing command may be sent/broadcast to other nodes. According to one embodiment, if a server is defined for a particular disk in a particular disk subsystem, the request may be sent to that server first. A different server may be defined for each disk, or a server may be defined for multiple disks. So, the file system manager can send the fence command to the NSD server that serves a disk in a list of disks to which a failed node has access. The NSD disk server receiving the fence command attempts to fence the failed node on all the disks in the list to which it has access and returns the outcome of the result of the fence operation of the disks in the list to the file system manager. If the file system manager observes that the NSD disk server has successfully completed fencing the failed node for all disks in the list, the file system manager is done with the fencing operation. If there are any disks that the disk server didn't completely fence, due to, e.g., path failure, or because it didn't have connection to the disk, the fsmgr will send a list those disks that still need to be fenced to the next disk server (e.g., the disk server defined for the first disk in the list of disks that have not yet been fenced). This process of forwarding requests to the next disk server may be repeated until all the servers have been tried or all disks in the list have been fenced. This repetitive attempt at fencing ensures that the fsmgr stays up as long as there is a possibility that some node in the cluster can perform the fence on behalf of the fsmgr.

As an illustrative example, consider a mixed Linux/AIX multi-node GPFS system, such as the system 100 shown in FIG. 1. In this system, Linux nodes 110, 115 and AIX nodes 120, 125 are connected to each other via a network, such as a Local Area Network (LAN) 130. Linux node 110 may be directly connected to a disk subsystem 140, while Linux node 115 is connected to the disk subsystem via LAN 130 The AIX nodes may be connected to the disk subsystem 150 via virtual shared disks 155 and 165 (VSDs), the VSDs using a client/server protocol that is working across a HPS 160. In this type of system, the GPFS initiates I/O requests to the VSD client, and the requests are sent to the VSD server that owns the physical connection to the disk. In the example shown in FIG. 1, the requests are sent to the VSD 155, which is directly connected to the disk subsystem 150. Thus, the VSD 165 allows node 125 to locally issue an I/O request that physically occurs on a disk in disk subsystem 150, which is attached to a remote node VSD server 155. While four nodes are shown in FIG. 1 for ease of illustration, it should be appreciated that any number of nodes may be used, either in local or remote connection with disk subsystems, depending on the needs of the user.

If, in a VSD environment, the VSD is the disk used to create NSD, then the fsmgr can issue a VSD fencing call. If the VSD fencing call fails because the VSD disk subsystem has crashed or switch failure has occurred or for any other reason, then the fsmgr can make a list of disks that need to be fenced. This list may be sent to the server of the first NSD in the list. Upon receiving the list, the server verifies it has access of a disk in the list and fences the entire disk for which it has access. Once the fencing operation is completed, a list of return codes is sent to the fsmgr indicating success or failure of the fencing operation for each NSD in the list. It is possible that only a partial list of disks were fenced, in which case the fsmgr makes a list of the rest of the NSDs that need to be fenced and resends this list to the server of the first NSD in the list, and that server performs the same operation described above. The fsmgr continues to do this until all NSDs are fenced, trying all servers exhaustively. Once the fence operation is successfully completed, the fsmgr starts the recovery action for the failed node and continues to operate and serve data. According to an exemplary embodiment, while the work flow described above is going on, the GPFS is in recovery mode, implying that all applications are waiting for I/O until recovery completes. According to exemplary embodiments, GPFS recovery failure is avoided for fsmgr in lux nodes with disk or on aix, which would normally result in application failure. According to exemplary embodiment, GPFS will succeed as long as some node in the cluster has access to the disk physically, thus keeping the application up and running through.

In the embodiment described above, any of the servers may serve as the file system manager. If the file system manager is the failed node, then another server may assume duties of the file system manager.

Assume, for example, that the Linux node 110 is the file system manager. Assume also that AIX node 125 has failed. In this case, the node 110 will need to "fence off" the failed node 125 to prevent it from having access to the disk subsystems 140 and 150. Accordingly, the node 110 issues a fencing call to the disk subsystem 140 to limit access to the disks in that subsystem by the failed node 125. Assuming that the fencing operation is successful, access to the disk subsystem 140 by the node 125 is thereby limited. Now, assume that the node 110 does not have access to the disk subsystem 150, e.g., due to path failure, so the node 110 cannot fence the disk subsystem and prevent access to it by the failed node 125. Accordingly, the node 110 may send a fencing call to the node 120 which, in turn, sends a fencing call to the disk subsystem 150 via VSD 155. Assuming that the fencing operation is successful, the node 120 returns an indication to the fsmgr node 110 that the fencing operation was successful for the disk subsystem 150. Thus, the fencing operation for fencing off the node 125 is successful, and node recovery can be initiated.

While the system shown in FIG. 1 shows only four nodes and two disk subsystems for ease of illustration, it should be appreciated that a cluster may include any number of nodes and disk subsystems. The greater the number of nodes and disk subsystems, the more complicated the fencing operation becomes.

Figure 2:
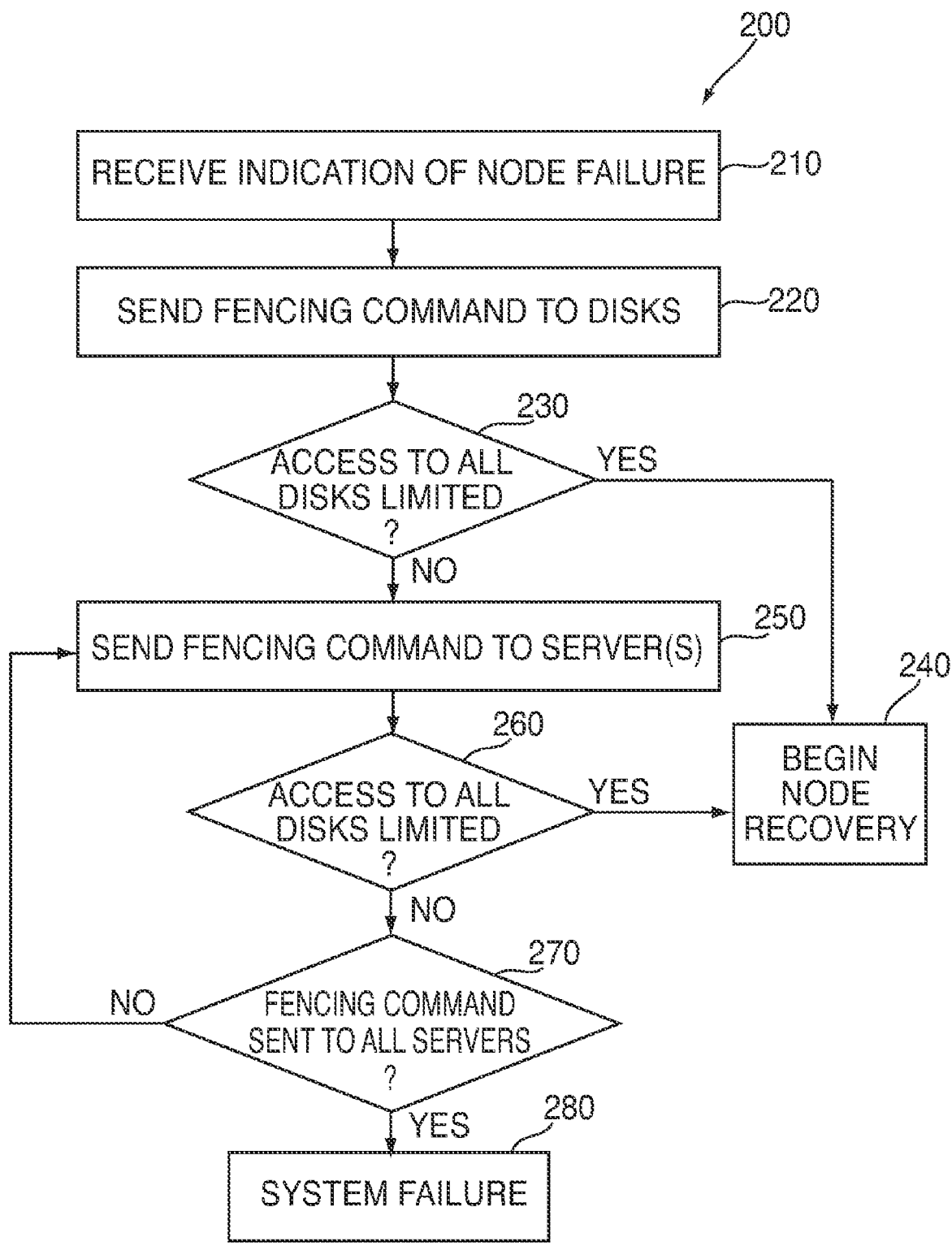
FIG. 2 illustrates an exemplary method for limiting file access according to an exemplary embodiment.

FIG. 2 illustrates a method for 200 limiting access by a failed node according to an exemplary embodiment. Upon receipt of an indication of a node failure at step 210, the filesystem manager attempts to fence the disks it has access to at step 220. At step 230, a determination is made whether the fencing command is successful and access to all the disks by the failed node is limited. If so, node recovery may be initiated at step 240. If the fencing command is not successful, e.g., because the filesystem manager does not have access to all the disks due to local path failure or switch failure or because the VSD or filesystem manager is not connected to the disks, access to all the disks by the failed node will not be limited. In this case, a fencing command is sent from the filesystem manager to at least one server having access to a disk subsystem to which the failed node has access at step 250 to limit access to disks in the disk subsystem by the failed node. A determination is made at step 260 whether the fencing command results in limiting of access of the failed node to all the disks in the disk subsystem. If so, the fencing command operation ends, and recovery of the failed node can be initiated at step 240. If not, a determination may be made at step 270 whether the fencing command has been sent to all servers known to have access to the disks in the disk subsystem to which the failed node has access. If not, the process returns to step 250, and a fencing command is sent to another server having access to the disks in the disk subsystem to limit access of the failed node to the disks in the disk subsystem. Once the fencing command results in limiting access to all the disks in the disk subsystem, the fencing operation ends, and recovery of the failed node can be initiated. Otherwise, as long as there are servers that have not yet been sent the fencing command, the command may be repeatedly sent to various servers until access to all the disks in the disk subsystem is limited or until the fencing command has been sent to all the servers. If the fencing command has been sent to all the servers but access has not been limited for all the disks in the disk subsystem to which the failed node has access, then a system failure occurs to avoid data corruption.

In the embodiment described above, the fencing command is sent respectively to one server at a time in an attempt to limit access by the failed node to the disk subsystem, thereby "fencing" the failed node be fenced.

As an alternative embodiment, the first receiving sever of the fencing command may fence all the disks that it has access to and then forward the fencing command to other nodes that have access to disks. This fencing command may be sent in a cascading fashion until all the disks are fenced, thus reducing the traffic between nodes.

According to yet another embodiment, the fsmgr may send the fence command to all servers known to have access to the disks concurrently, and each server receiving the command may fence all the disks it can and send the results of the fencing operation back to the fsmgr. The fsmgr may scan and analyze the results from all the servers and make sure that all disks got fenced. If all disks are fenced, then node recovery can be initiated. Otherwise, a system failure occurs to avoid data corruption.

According to yet another embodiment, a fence failure may drive a server to send I/O traffic to the other servers, instead of handling it locally, because fence failure implies that there may be path failures. Thus, fence failure also serves as notification of path failure before the path failure is actually detected.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for limiting file access of a failed node in a multi-node computer system having one or more disk subsystems therein, the method comprising:
   in response to an indication of node failure, initiating a fencing operation to fence the failed node from a group of disks to which the failed node initially has access by sending, from a file system manager of the failed node, a fencing command to each of the one or more disk subsystems that includes therein at least one disk from the group of disks;
   if the fencing command fails to limit access by the failed node to each disk in the group of disks, sending the fencing command to another node in the multi-node computer system having access to at least one of the group of disks to which the failed node has not been prevented access; and
   if the fencing command sent to the another node still fails to limit access by the failed node to each disk in the group of disks, sending the fencing command to at least one or more additional nodes in the multi-node computer system having access to at least one of the group of disks to which the failed node has not been prevented access, until access by the failed node to all of the disks in the group of disks has been limited or until the fencing command has been sent to all nodes in the multi-node computer system.

2. The method of claim 1, wherein if the fencing command results in limiting access to only a portion of the group of disks, the next fencing command sent to a node includes a list of remaining disks in the group of disks for which access still needs to be limited.

3. The method of claim 1, wherein the fencing command is repeatedly sent to nodes one at a time until access to all of the group of disks by the failed node is limited.

4. The method of claim 1, wherein the fencing command is forwarded from node to node until access to all of the group of disks by the failed node is limited.

5. The method of claim 1, wherein the fencing command is sent concurrently to all nodes known to have access to at least a portion of the group of disks.

6. The method of claim 1, wherein the failed node sends its I/O traffic to other nodes, and operation of the other nodes in the multi-node file system continues during the process of limiting access for the failed node.

7. The method of claim 1, wherein the multi-node file system is a heterogeneous system.

8. A computer program product comprising a computer readable storage medium having a computer readable program stored thereon, wherein the computer readable program, when executed on a computer, causes the computer to:
in response to receiving an indication of a node failure, initiate a fencing operation to fence the failed node from a group of disks to which the failed node initially has access by sending a fencing command, from a file system manager of the failed node within a multi-node computer system, to each of one or more disk subsystems that includes therein at least one disk from the group of disks;
if the fencing command fails to limit access by the failed node to each of the one or more disks in the disk subsystem, sending the fencing command to another node in the multi-node computer system having access to at least one of the one or more disks in the disk subsystem to which the failed node has access; and
if the fencing command sent to the another node still fails to limit access by the failed node to each disk in the group of disks, sending the fencing command to one or more additional nodes in the multi-node computer system having access to at least one of the group of disks to which the failed node has not been prevented access, until access by the failed node to all of the disks in the group of disks has been limited or until the fencing command has been sent to all nodes in the multi-node computer system.

9. The computer program product of claim 8, wherein if the fencing command results in limiting access to only a portion of the group of disks, the next fencing command sent includes a list of remaining disks in the group of disks for which access still needs to be limited.

10. The computer program product of claim 8, wherein the fencing command is sent repetitively to nodes one at a time until access to all of the group of disks by the failed node is limited.

11. The computer program product of claim 8, wherein the fencing command is forwarded from one node to another until access to all of the group of disks by the failed node is limited.

12. The computer program product of claim 8, wherein the fencing command is sent concurrently to all nodes known to have access to at least a portion of the group of disks.

13. The computer program product of claim 8, wherein the failed node sends its I/O traffic to other nodes operation of other nodes in the multi-node file system continues during the process of limiting access for the failed node.

14. A system for limiting file access by a failed node in a multi-node computer system, comprising:
an input for receiving an indication of a node failure; and
a processor for initiating a fencing operation to fence the failed node from a group of disks to which the failed node initially has access by sending a fencing command to each of one or more disk subsystems that includes therein at least one disk from the group of disks, wherein if the fencing command fails to limit access by the failed node to each disk in the group of disks, the processor sends the fencing command to another node in the multi-node computer system having access to at least one of the group of disks to which the failed node has not been prevented access, and, if the fencing command sent to the another node still fails to limit access by the failed node to each disk in the group of disks, sending the fencing command to one or more additional nodes in the multi-node computer system having access to at least one of the group of disks to which the failed node has not been prevented access, until access by the failed node to all of the disks in the group of disks has been limited or until the fencing command has been sent to all nodes in the multi-node computer system.

15. The system of claim 14, wherein if the fencing command results in limiting access to only a portion of the group of disks in the disk subsystem, the next fencing command sent by the processor includes a list of remaining disks in the group of disks for which access still needs to be limited.

16. The system of claim 14, wherein the fencing command is sent repetitively to nodes until access to all of the group of disks by the failed node is limited.

17. The system of claim 14, wherein the fencing command is forwarded from node to node until access to all of the group of disks in the disk subsystem by the failed node is limited.

18. The system of claim 14, wherein the processor sends the fencing command concurrently to all the nodes known to have access to at least a portion of the group of disks.

19. The system of claim 14, wherein the node that has failed sends its I/O traffic to other nodes, and operation of other nodes in the multi-node file system continues during the process of limiting access for the failed node.

20. The system of claim 14, wherein the multi-node computer system is a heterogeneous system.

* * * * *